United States Patent
Anchors, Jr.

(10) Patent No.: US 10,434,909 B2
(45) Date of Patent: Oct. 8, 2019

(54) VEHICLE SEAT COVER

(71) Applicant: Run's Done, LLC, Cumming, GA (US)

(72) Inventor: Jerry K. Anchors, Jr., Cumming, GA (US)

(73) Assignee: RUN'S DONE, LLC, Cumming, GA (US)

( * ) Notice: Subject to any disclaimer, the term of this patent is extended or adjusted under 35 U.S.C. 154(b) by 0 days.

(21) Appl. No.: 15/906,854

(22) Filed: Feb. 27, 2018

(65) Prior Publication Data

US 2019/0263300 A1    Aug. 29, 2019

(51) Int. Cl.
B60N 2/60 (2006.01)

(52) U.S. Cl.
CPC .................. B60N 2/6036 (2013.01)

(58) Field of Classification Search
CPC .................................... B60N 2/6036
USPC ........................... 297/228.12, 229
See application file for complete search history.

(56) References Cited

U.S. PATENT DOCUMENTS

| | | |
|---|---|---|
| 348,782 A | 9/1886 | Sawyer |
| 1,444,014 A | 2/1923 | Truesdell |
| 1,882,485 A | 10/1932 | Clements |
| 2,754,532 A | 7/1956 | Kanehl |
| 3,199,916 A | 8/1965 | Chiarenza |
| D274,108 S | 6/1984 | Trotman et al. |
| 4,529,248 A | 7/1985 | Trotman et al. |
| 4,621,003 A | 11/1986 | O'Kane |
| D294,319 S | 2/1988 | Troup et al. |
| 4,969,683 A | 11/1990 | Wallace et al. |
| D316,483 S | 4/1991 | Haack |
| D342,405 S | 12/1993 | Hazel |
| 5,448,938 A | 9/1995 | Fernandez et al. |
| 5,494,330 A | 2/1996 | Fotsch |
| D394,924 S | 6/1998 | Julien |
| D416,741 S | 11/1999 | Denney et al. |
| 6,089,659 A | 7/2000 | Toyota |
| 6,338,527 B1 * | 1/2002 | Toyota ................. B60N 2/6054 297/229 X |
| 6,648,410 B2 * | 11/2003 | Sparks ................. B60N 2/6036 297/228.1 |

(Continued)

FOREIGN PATENT DOCUMENTS

| DE | 202010004666 | 8/2010 |
|---|---|---|
| DE | 102011087172 | 5/2012 |

(Continued)

OTHER PUBLICATIONS alibaba.com; Article entitled: "New Microfiber Suede Non-Slip Gym Sports Fitness Exercise Yoga Towel" located at <https://yourweavers.en.alibaba.com/product/60576710693-220315306/New _Microfiber_ Suede _Non_ Slip_ Gym_ Sports _Fitness_ Excersice _ Yoga_ Tow>, accessed on Aug. 22, 2017, 7 pgs.

(Continued)

*Primary Examiner* — Anthony D Barfield
(74) *Attorney, Agent, or Firm* — Taylor English Duma LLP (57) ABSTRACT

A seat cover for a seat includes a seat portion formed from a flexible material; a back portion joined to the seat portion, a bottom end of the back portion joined to a rear end of the seat portion, a seat cover open angle between the seat portion and the back portion being adjustable; and a removable strap configured to secure the back portion of the seat cover to a headrest of the seat.

11 Claims, 11 Drawing Sheets

(56) References Cited

U.S. PATENT DOCUMENTS

| | | | |
|---|---|---|---|
| D538,725 S | 3/2007 | Eskandry | |
| 7,374,240 B2 | 5/2008 | Gold et al. | |
| D581,726 S | 12/2008 | Shamoon | |
| 7,607,732 B2 * | 10/2009 | Beroth | B60N 2/6054 |
| | | | 297/228.12 X |
| D611,751 S | 3/2010 | Siklosi | |
| 7,878,588 B2 | 2/2011 | Snedeker | |
| 7,931,335 B1 | 4/2011 | Siklosi et al. | |
| D680,360 S | 4/2013 | Ogawa | |
| D707,063 S | 6/2014 | Daley | |
| D713,176 S | 9/2014 | Shiheiber | |
| D713,654 S | 9/2014 | Robbins, III et al. | |
| 8,870,283 B2 | 10/2014 | Daley | |
| D716,585 S | 11/2014 | Peterson | |
| D728,973 S | 5/2015 | Daley | |
| D729,546 S | 5/2015 | Daley | |
| 9,045,067 B2 | 6/2015 | Long et al. | |
| D734,562 S | 7/2015 | Steidle | |
| D766,018 S | 9/2016 | Coward | |
| D768,412 S | 10/2016 | Ngo | |
| 9,610,876 B2 | 4/2017 | Allos | |
| D807,667 S | 1/2018 | Cooper | |
| D807,668 S | 1/2018 | Moore | |
| D821,784 S | 7/2018 | Can | |
| 2002/0096919 A1 | 7/2002 | Sparks | |
| 2005/0225135 A1 | 10/2005 | Moses | |
| 2007/0170757 A1 | 7/2007 | Lanham et al. | |
| 2007/0262624 A1 | 11/2007 | Snedeker | |
| 2008/0179926 A1 | 7/2008 | Kushner | |
| 2011/0272982 A1 | 11/2011 | McDonald | |
| 2012/0210517 A1 | 8/2012 | Patel | |
| 2013/0269112 A1 | 10/2013 | Legare | |
| 2014/0322490 A1 | 10/2014 | Vreys et al. | |
| 2015/0097402 A1 * | 4/2015 | Bee | B60N 2/6018 |
| | | | 297/229 X |
| 2015/0291071 A1 | 10/2015 | Thompson | |
| 2016/0317897 A1 | 11/2016 | Mariano | |
| 2017/0189742 A1 | 7/2017 | Mangum et al. | |
| 2018/0027987 A1 | 2/2018 | Calhoun et al. | |

FOREIGN PATENT DOCUMENTS

| | | |
|---|---|---|
| FR | 2999125 | 6/2014 |
| FR | 3028160 | 6/2017 |

OTHER PUBLICATIONS aliexpress.com; Article entitled: "Non-Slip Car Seat Cover", located at (<http://www.aliexpress.com/item-img/Quality-3pcs-Non-slip-universal-car-seat-cover-set-car-seat-cushion-car-accessories-interior-auto/2020411643.html#>, accessed on Aug. 17, 2017, 3 pgs.

amazon.com; Article entitled: "Poppypet PT16051103 Heavy Duty Waterproof Seat Covers, Black", located at <https://www.amazon.co.uk/Poppypet-Protector-Waterproof-Hammock-Travel/dp/B01FJQQ8HI/ref=sr_1_19?e=UTF8&qid=1469444664&sr=8-19&keywords=pet+car+seat+protector>, accessed on Aug. 17, 2017, 6 pgs.

Happegear, article entitled: "How it works", located at <https://happegear.com/pages/how-it-works>, accessed on Aug. 22, 2017, 2 pgs.

Happegear; article entitled: "Happeseat® Moisture Wicking Microfiber Car Seat Cover", located at <https://happegear.com/collections/happegear/products/happeseat-moisture-wicking-microfiber-car-seat-cover#.WZyKNj594-W/>, accessed on Aug. 22, 2017, 3 pgs.

Anchors Jr., Jerry K.; Non-Final Office Action for U.S. Appl. No. 29/636,566, filed Feb. 9, 2018, dated Jul. 30, 2019, 20 pgs.

Anchors, Jr., Jerry K.; Non-Final Office Action for U.S. Appl. No. 29/636,567, filed Feb. 9, 2018, dated Jun. 25, 2019, 18 pgs.

* cited by examiner

VEHICLE SEAT COVER

TECHNICAL FIELD

Field of Use

This disclosure relates to covers for protection of a seat. More specifically, this disclosure relates to covers that protect a vehicle seat against moisture and soiling.

Related Art

Exercise is a popular activity that often requires its participants to travel from one exercise locale or competition to another in a vehicle. Following exercise, many runners and other sports enthusiasts can transfer sweat, odor, and/or dirt to their vehicle seat's upholstery. Any seat covers that exercise participants may use in an attempt to cover their vehicle upholstery often do not remain in position or perform poorly for other reasons and therefore can fail to accomplish their intended purpose. It can be difficult to secure such a protective cover, much less find a device that is adjustable for different seats. Moreover, the available devices do not easily accommodate multiple types of seats.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a seat cover for a seat, the seat cover comprising: a seat portion formed from a flexible material; a back portion joined to the seat portion, a bottom end of the back portion joined to a rear end of the seat portion, a seat cover open angle between the seat portion and the back portion being adjustable; and a removable strap configured to secure the back portion of the seat cover to a headrest of the seat.

In a further aspect, disclosed is a seat cover for a seat, the seat cover comprising: a seat portion formed from a flexible material, the seat portion defining a first side surface and a second side surface opposite from the first side surface; a back portion formed from the flexible material and joined to the seat portion, the back portion defining a first side surface and a second side surface opposite from the first side surface, a bottom end of the back portion joined to a rear end of the seat portion, an angle between the seat portion and the back portion being adjustable; and a tab extending from an intersection of the back portion and the seat portion, the tab forming a pocket defining a pocket opening facing the intersection of the back portion and the seat portion, the pocket opening sized to receive a user's hand.

In yet another aspect, disclosed is a seat cover comprising: a panel formed from a flexible material, the panel defining a first side surface and a second side surface opposite from the first side surface, the first side surface defining a plurality of anti-slip elements arranged in a regular pattern; and an elastic strap secured to an outer edge of the panel, both of a pair of ends of the strap permanently secured to the outer edge.

In yet another aspect, disclosed is a method of using a seat cover, the method comprising: positioning the seat cover over a seat, the seat cover comprising a seat portion formed from a flexible material, the seat portion defining a first side surface and a second side surface opposite from the first side surface; and a back portion formed from the flexible material and joined to the seat portion, the back portion defining a first side surface and a second side surface opposite from the first side surface, a bottom side of the back portion joined to a rear side of the seat portion; and a tab extending from an intersection of the back portion and the seat portion, the tab forming a pocket defining a pocket opening facing the intersection of the back portion and the seat portion; placing the seat cover on the seat with the first side surface of the seat portion of the seat cover contacting a seat cushion of the seat; inserting a hand of a user into the pocket opening defined in the tab; pushing the tab of the seat cover into a space between a back cushion and the seat cushion of the seat; and positioning the first side surface of the back portion against the back cushion of the seat.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the seat nearest to and occupied by a user of a seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

Figure 1:
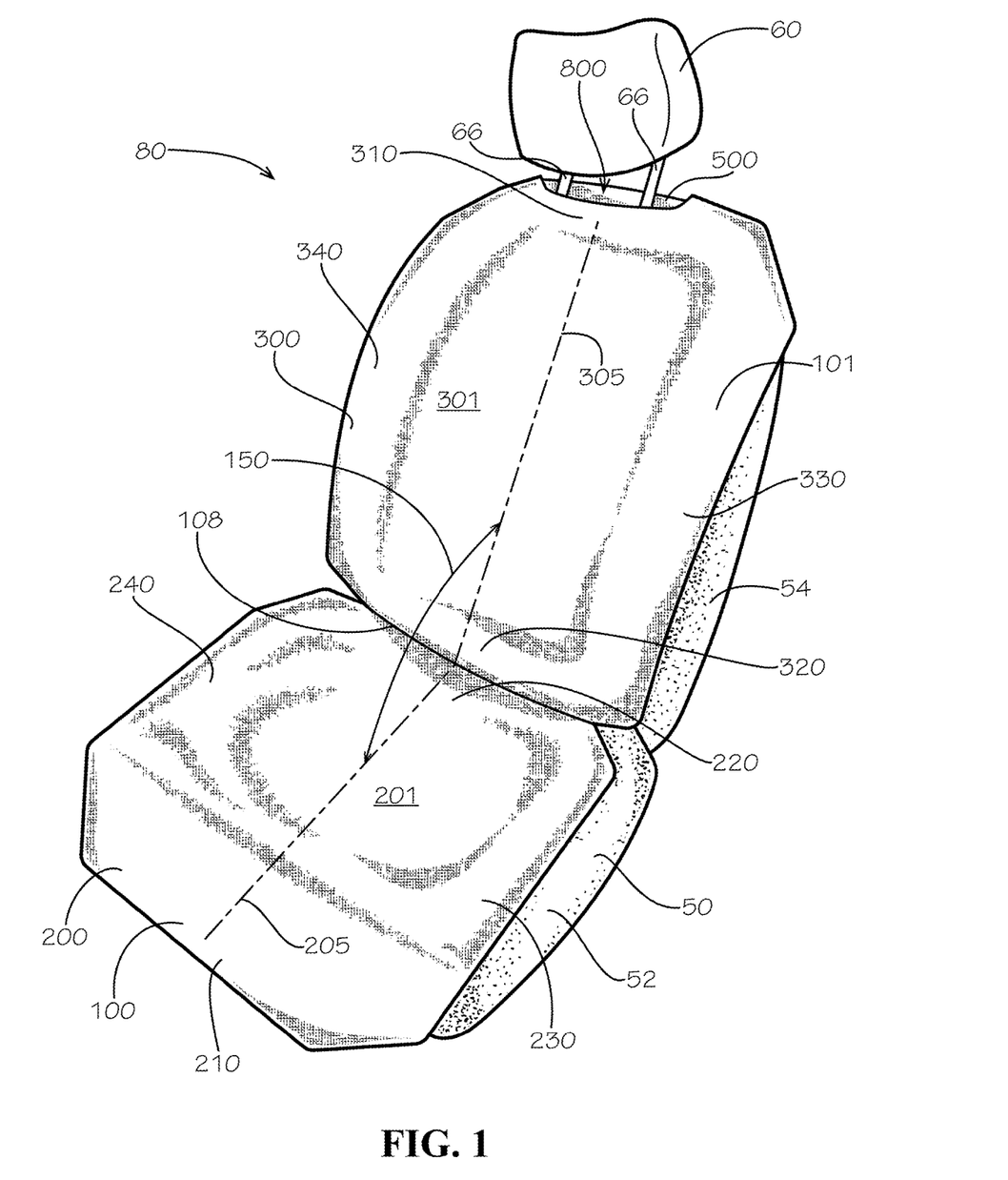
FIG. 1 is a perspective view of a seat cover when draped over and secured to a vehicle seat with an attachment strap in accordance with one aspect of the current disclosure.

In some aspects, a seat cover and associated methods, systems, devices, and various apparatuses are disclosed herein. In some aspects, the seat cover can comprise a pocket. In some aspects, the seat cover can comprise a strap. FIG. 1 shows a seat cover 100 installed on a seat 50 as part of a seat cover system 80. The seat 50 can comprise a seat cushion 52 and a back cushion 54. The seat cushion 52 can be joined or connected to the back cushion 54 by a frame (not shown) of the seat 50. The seat 50 can further comprise a headrest 60. The headrest 60 can comprise or be joined to one or more headrest posts 66, which can be inserted into or otherwise engage with the back cushion 54 of the seat 50 to secure the headrest 60 to the seat 50. In some aspects, the seat 50 can be installed inside a vehicle such as, for example and without limitation, an automobile, a truck, a bus, a golf or utility cart, a train, a boat, or an airplane. In other aspects, the seat 50 need not be installed inside any vehicle.

The seat cover 100 can comprise a seat portion 200 and a back portion 300. The seat portion 200 can comprise a front end 210, a rear end 220, a first side end 230, and a second side end 240. The back portion 300 can comprise a top end 310, a bottom end 320, a first side end 330, and a second side end 340. The seat cover 100 can define a top surface 101 and a bottom surface 102 (shown in FIG. 2). More specifically, the seat portion 200 can define a top surface 201 and a bottom surface 202 (shown in FIG. 2), which can be opposite from the top surface 201 or on an opposite side of any material blank forming the seat portion 200; and the back portion 300 can define a front surface 301 and a rear surface 302 (shown in FIG. 2), which can be opposite from the front surface 301 or on an opposite side of any material blank forming the back portion 300. Any of the top surface 101, the top surface 201, or the front surface 301 can be a first side surface; while any of the bottom surface 102, bottom surface 202, or rear surface 302 can be a second side surface.

The back portion 300 can be joined or connected to the seat portion 200 at a joint 108. More specifically, a bottom end 320 of the back portion 300 can be joined to a rear end 220 of the seat portion 200 at the joint 108. A seat cover open angle 150 between a centerline 205 of the seat portion 200 as the back portion 300 lays against any flat surface and a centerline 305 of the back portion 300 as the back portion 300 lays against any flat surface can be adjustable between zero and 360 degrees. As shown, the back portion 300 of the seat cover 100 and a strap 500 can define an opening 800 sized to receive the headrest post (or posts) 66 of the headrest 60.

Figure 2:
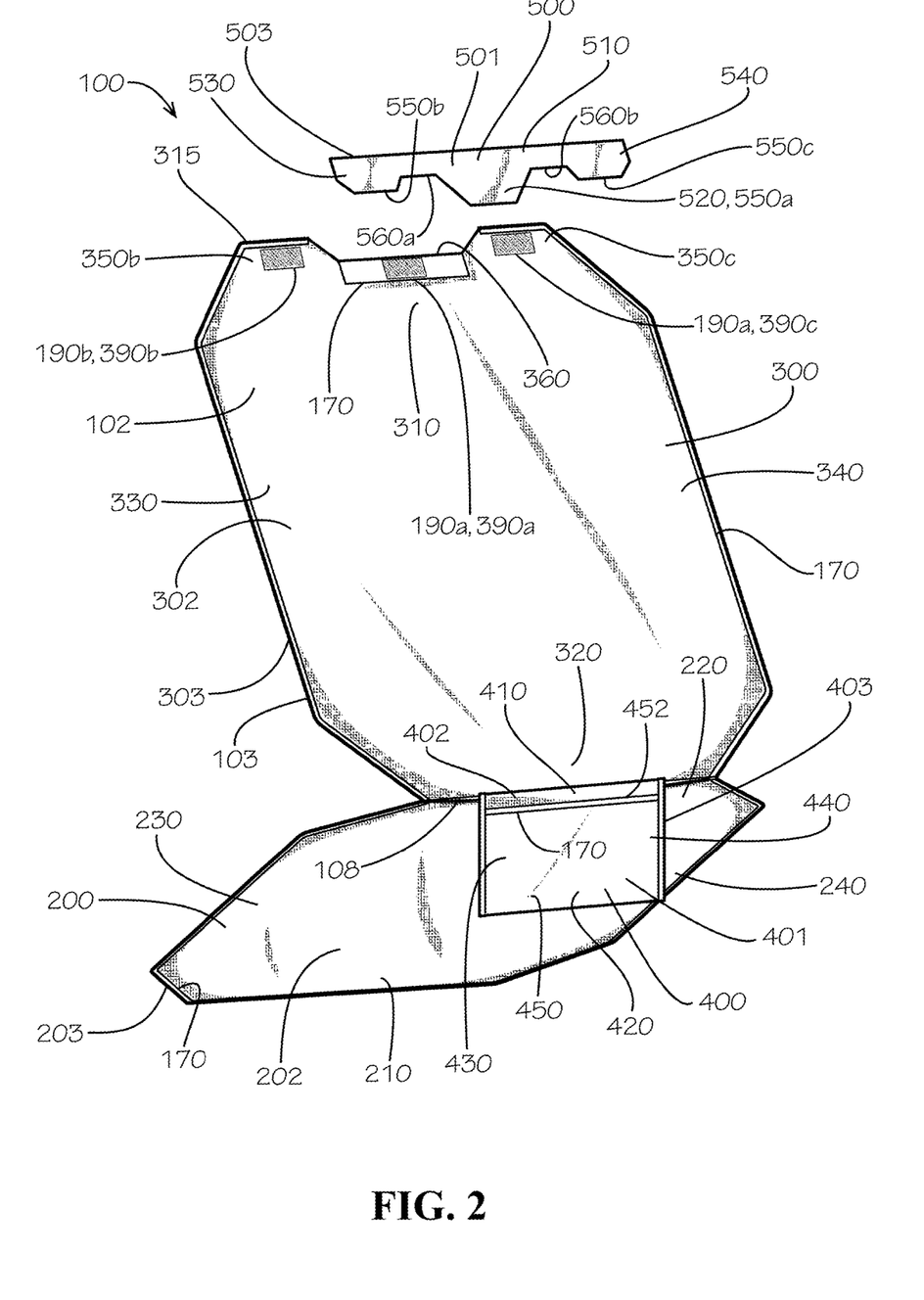
FIG. 2 is an exploded rear bottom perspective view of the seat cover of FIG. 1 when a seat portion of the seat cover is angled at approximately 90 degrees with respect to a back portion of the seat cover and a surface of a pocket of the seat cover is angled with respect to the seat portion and the back portion.

As shown in FIG. 2, the back portion 300 can further define an attachment portion 315, which can be proximate to the top end 310. The attachment portion 315 can comprise protrusions 350b,c, which can extend away from the joint 108 and can define a distalmost portion of the attachment portion 315 of the back portion 300. The protrusions 350b,c can define a notch 360 therebetween. A fastener 190a can be positioned proximate to an edge 303 of the back portion 300 at the notch 360. Two additional fasteners 190b,c can be positioned proximate to the edge 303 of the back portion 300 at the protrusions 350b,c. Each of the fasteners 190a,b,c can be a hook-and-loop fastener. Each of the fasteners 190a,b,c can comprise a fastener half 390a,b,c, which can be secured to the back portion 300 and can comprise a plurality of hooks or a plurality of loops for securing to a mating fastener half 590a,b,c (shown in FIG. 5).

As further shown in FIG. 2, the seat cover 100 can comprise a tab 400, which can extend from the joint 108 formed at the intersection of the back portion 300 and the seat portion 200. The tab 400 can comprise a proximal end 410, which can be attached to the joint 108, a distal end 420 distal from the proximal end 410, a first side end 430, and a second side end 440. The tab 400 can form a pocket 450 defining a pocket opening 452. In some aspects, for reasons that will be described below, the pocket opening 452 can face the joint 108. The tab 400 can define an outside surface 401 and an inside surface 402, which can be opposite from the outside surface 401 or on an opposite side of any material blank forming the tab 400.

Also as shown, the seat cover 100 can comprise the strap 500, which can be secured—and can be configured to be secured—to the back portion 300 of the seat cover 100 to the headrest 60 of the seat 50. The strap 500, which can be an attachment strap, can comprise a top end 510, a bottom end 520, a first side end 530, and a second side end 540. The strap 500 can define an outside surface 501 and an inside surface 502 (shown in FIG. 3), which can be opposite from the outside surface 501 or on an opposite side of any material blank forming the strap 500. In some aspects, as shown, the strap 500 can be removable. In other aspects, the strap 500 can be permanently secured to the seat cover 100.

In some aspects, the strap 500 can comprise protrusions 550a,b,c, which can extend away from the top end 510 of the strap 500 and can define a bottommost portion of the strap 500. The protrusions 550a,b can define a notch 560a therebetween; and the protrusions 550a,c can define a notch 560b therebetween. A first protrusion 550a of the protrusions 550a,b,c can be aligned with a centerline 505 (shown in FIG. 5) of the strap 500, and second and third protrusions 550b,c of the protrusions 550a,b,c can be positioned on either side of the first protrusion 550a. The other aspects, neither the back portion 300 nor the strap 500 need comprise the protrusions 350a,b or the protrusions 550a,b,c, respectively, in which case the top end 310 of the back portion 300 or the bottom end 520 of the strap 500 can define a substantially straight edge.

Any one of an edge 103 of the seat cover 100, an edge 203 of the seat portion 200, the edge 303 of the back portion 300, an edge 403 of the tab 400, and an edge 503 of the strap 500 can comprise a hem 170, i.e., a folded edge, to yield benefits such as, for example and without limitation, the prevention of fraying of the material forming the seat cover 100, the presentation of a smooth edge instead of a sharp edge to the user and any others handling the seat cover 100, and aesthetics (i.e., an improved appearance). Any one of the edges 103,203,303,403,503 can receive another edge treatment 104 (shown in FIG. 13) such as, for example and without limitation, stitching, heat, and/or welding to contain or stabilize the material for any of the same exemplary reasons mentioned above.

Figure 3:
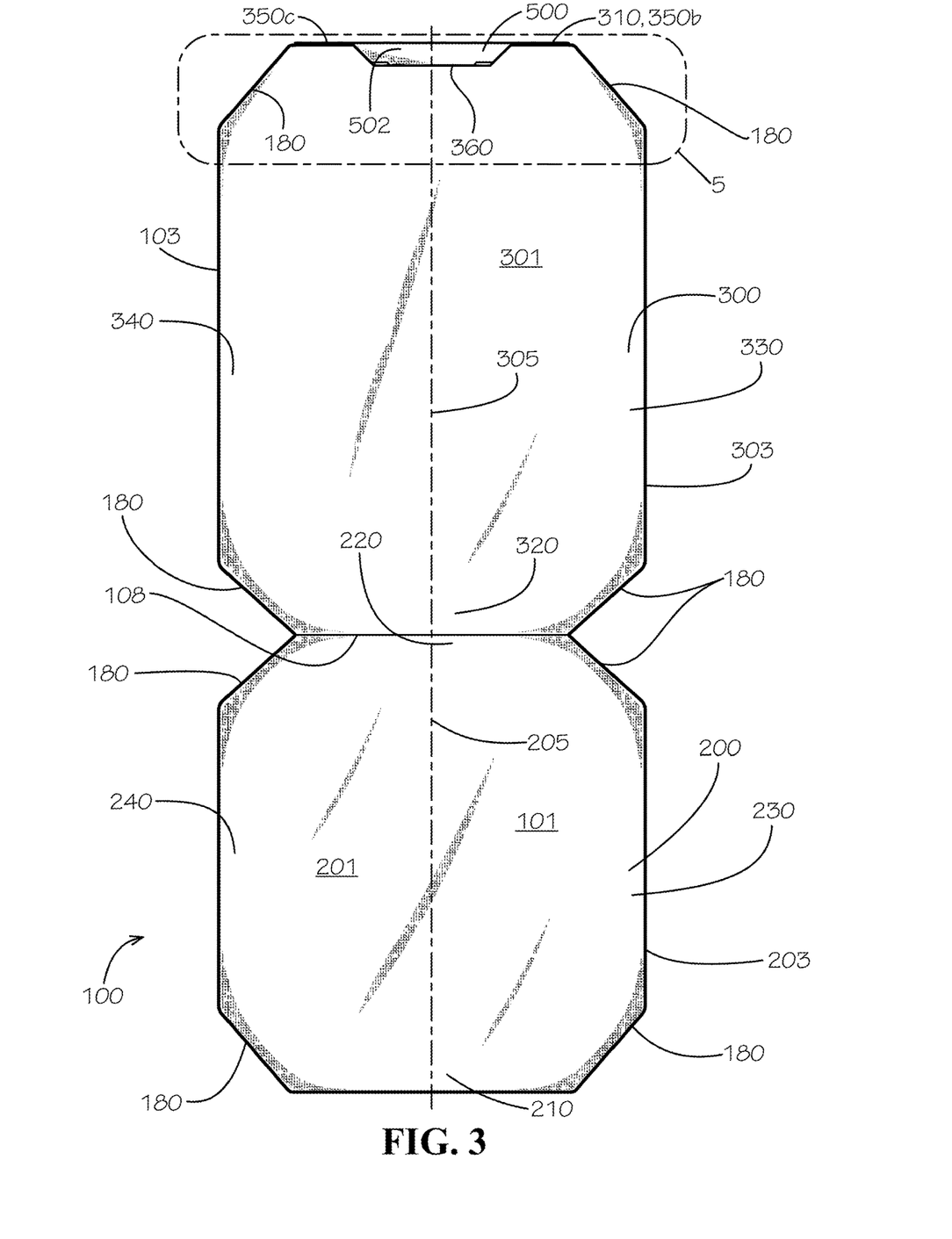
FIG. 3 is a top plan view of the seat cover of FIG. 1 when in a flat condition.

FIG. 3 shows a top plan view of the seat cover 100 when in a flat condition. As with other aspects of the appearance of the seat cover 100, the specific shape and surface texture can be adjusted to meet any one of a number of aesthetic tastes. More specifically, the seat cover 100 can define corner treatments 180 at intersections of intersecting ends 210,220,230,240 of the seat portion 200 or at intersections of intersecting ends 310,320,330,340 of the back portion 300. The corner treatments 180 can be desirable in some situations to reduce interference with the seat 50. In some aspects, as shown, for example, the seat cover 100 can have a more "boxy" look with corner treatments that can each resemble a chamfer defining a straight edge. In other aspects, the seat cover 100 can have a more rounded appearance (as exemplarily shown in FIG. 13) throughout without any particular functional effect. In some aspects, as shown, the seat cover 100 can have a relatively smooth appearance. In other aspects, the seat cover 100 can have a textured appearance.

Figure 4:
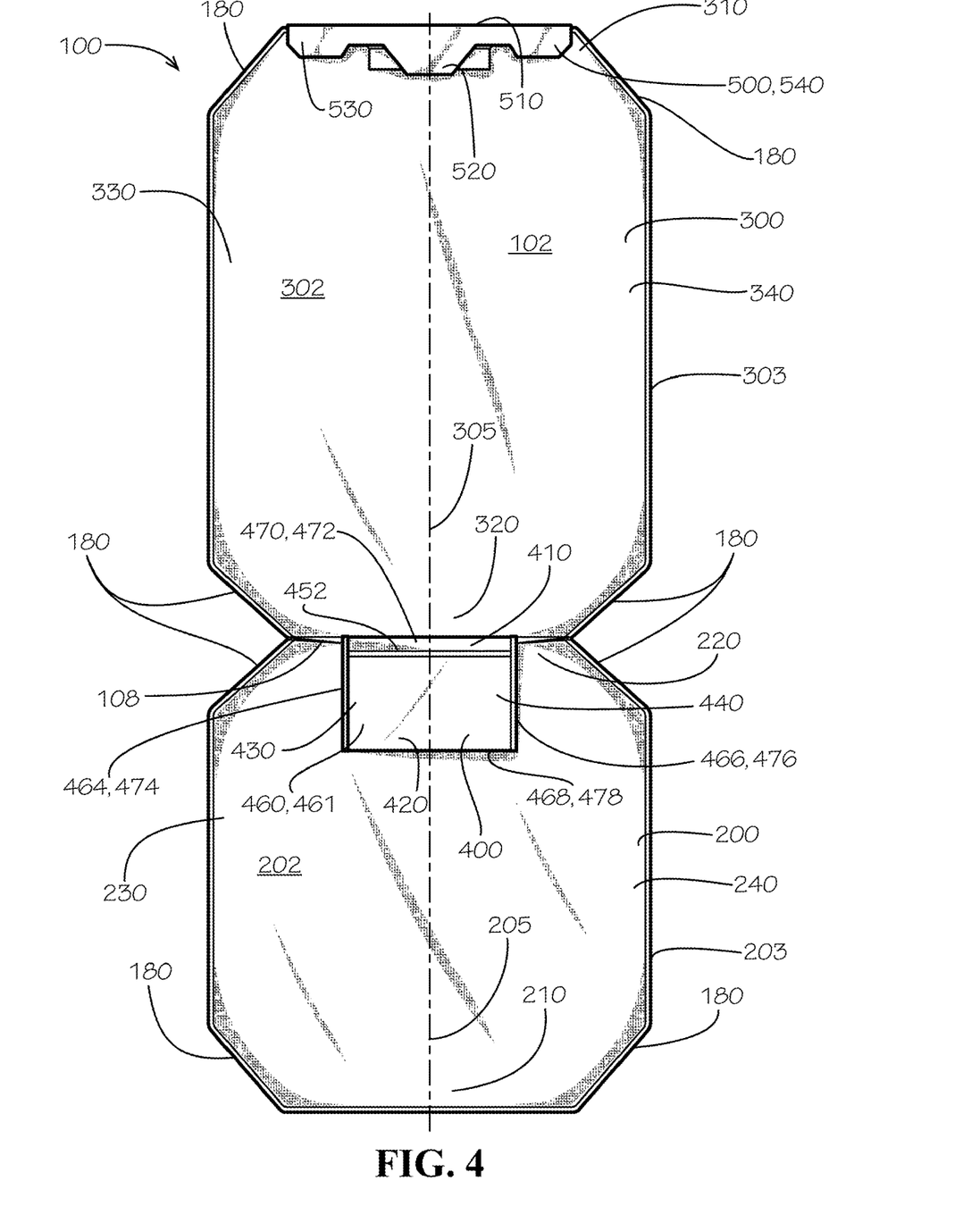
FIG. 4 is a bottom plan view of the seat cover of FIG. 1 when in a flat condition.

FIG. 4 is a bottom plan view of the seat cover 100 when in a flat condition. As shown, the pocket 450 of the tab 400 can comprise a front panel or first panel 460 and a back panel or second panel 470, which can be positioned behind or under the first panel 460, and thus between the first panel 460 and the seat portion 200. The first panel 460 can define an outside surface 461 and an inside surface (not shown). The second panel 470 can define an outside surface (not shown) and an inside surface 472. The inside surface of the first panel 460 can face the inside surface 472 of the second panel 470. A first side edge 464 of the first panel 460 can be joined to a first side edge 474 of the second panel 470. A second side edge 466 of the first panel 460 can be joined to a second side edge 476 of the second panel 470. A third side edge 468 of the first panel 460 can be joined to a third side edge 468 of the second panel 470. The first panel 460 and the second panel 470 can form a cavity 480 (shown in FIG. 6) therebetween, In some aspects, the only opening to the cavity 480 can be the pocket opening 452. In other aspects, the cavity 480 can have more than one opening. In other aspects, the cavity 480 can be closed on all sides and have no opening. In some aspects, as shown, the tab 400 can have a rectangular shape. More specifically, the tab can measure, for example and without limitation, approximately 230 mm (9 inches) in the width direction W and approximately 120 mm (5 inches) in the length direction L. In other aspects, the tab 400 can have a non-rectangular shape such as, for example and without limitation, a semicircular shape with only a single side edge 464.

Figure 5:
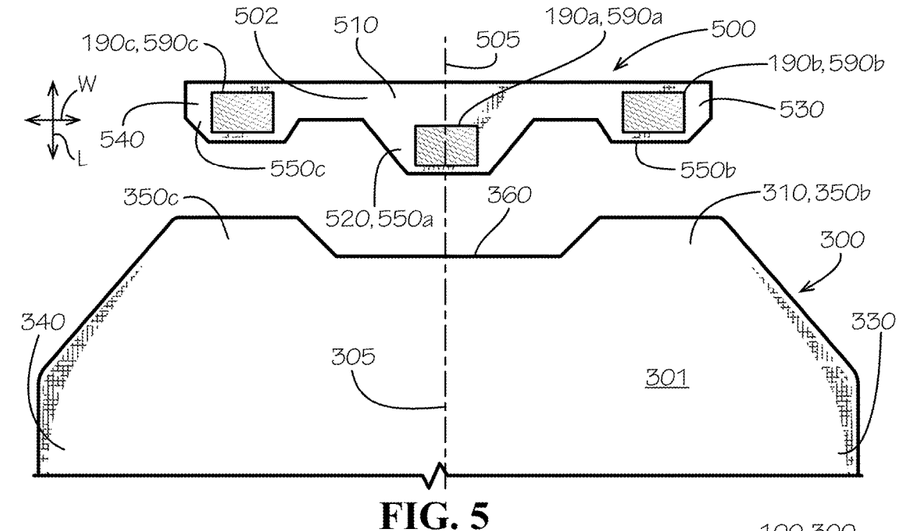
FIG. 5 is a detail view of the seat cover of FIG. 1 taken from detail 5 of FIG. 3.

As shown in FIG. 5, each of the fasteners 190*a*,*b*,*c*—and the corresponding mating fastener half 590*a*,*b*,*c*—can be positioned on and secured to the strap 500 proximate to each of the protrusions 550*a*,*b*,*c* or at any other position on the strap 500. Each of the fasteners 190*a*,*b*,*c* can comprise the mating fastener half 590*a*,*b*,*c*, which can be secured to the strap 500 and can comprise a plurality of hooks or a plurality of loops for securing to the fastener half 390*a*,*b*,*c* (shown in FIG. 2). In some aspects, any of the fasteners 190*a*,*b*,*c*, the fastener halves 390*a*,*b*,*c*, and the mating fastener halves 590*a*,*b*,*c* can have a rectangular shape as shown. More specifically, the rectangular shape of the fasteners 190*a*,*b*,*c*, the fastener halves 390*a*,*b*,*c*, and the mating fastener halves 590*a*,*b*,*c* can measure, for example and without limitation, 1¾" in a transverse or width direction W and ¾" in a longitudinal or length direction L. In other aspects, any of the fasteners 190*a*,*b*,*c*, the fastener halves 390*a*,*b*,*c*, and the mating fastener halves 590*a*,*b*,*c* can have a non-rectangular shape.

Figure 6:
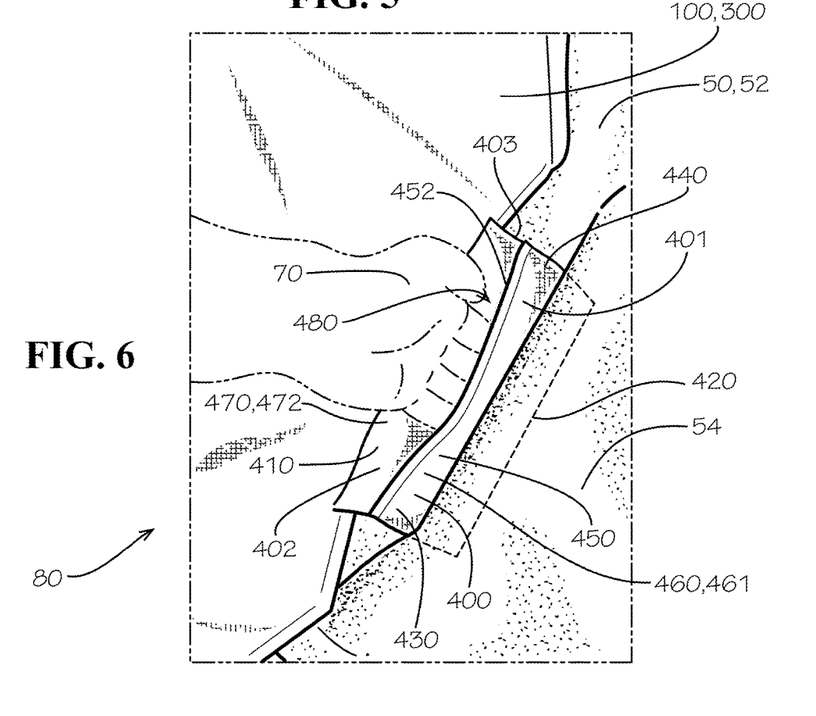
FIG. 6 is a perspective view of the pocket of FIG. 2 being installed in the seat of FIG. 1.

FIG. 6 shows the pocket 450 of the tab 400 being installed in the seat 50. In some aspects, as shown, the pocket opening 452 can be sized to receive all five fingers of a user's hand 70. In other aspects, the pocket opening 452 can be sized to receive something smaller or larger than the user's hand 70. As shown, the tab 400 can be inserted between the seat cushion 52 and the back cushion 54 of the seat 50. The compressible nature of each of the seat cushion 52 and the back cushion 54 due to the properties of the materials forming each can both facilitate insertion of the tab 400 (by opening upon insertion of the tab 400) and facilitate retention of the tab 400 (by closing upon removal of the hand 70 from the tab 400). As shown, the cavity 480, the pocket opening 452, and the outside surface 461 of the first panel 460 of the tab 400 can face up or away from the seat cushion 52 to facilitate insertion of the hand 70 because of the resulting visibility of the pocket opening 452 to the user, who will likely be facing down towards the seat cushion 52 after the seat portion 200 is already positioned on top of the seat cushion 52.

Figure 7:
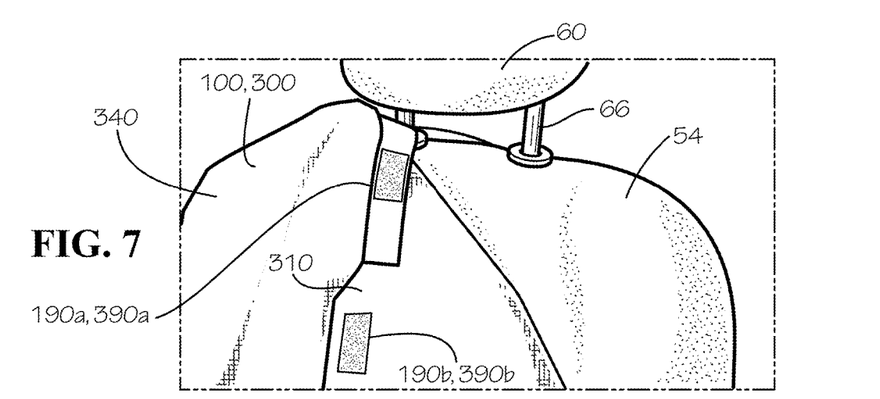
FIG. 7 is a perspective view of first and second steps of securing the attachment strap of FIG. 1 to a headrest of the seat of FIG. 1.
Figure 8:
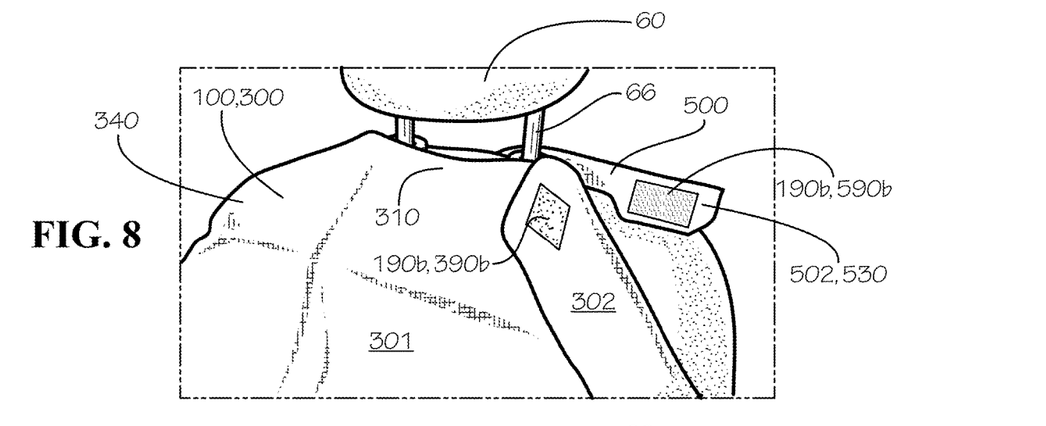
FIG. 8 is a perspective view of second and third steps of securing the attachment strap of FIG. 1 to the headrest of the seat of FIG. 1.
Figure 9:
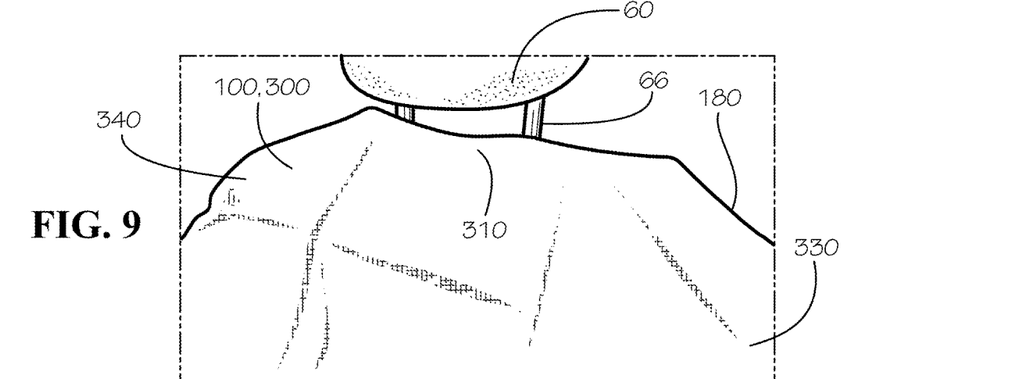
FIG. 9 is a perspective view of a final condition of the seat cover of FIG. 1 after securing the strap of FIG. 1 to the back portion of the seat cover about the headrest of the seat of FIG. 1.

FIGS. 7-9 show several steps involving attachment of the seat cover 100 to the seat 50 at the headrest 60. FIG. 7 shows first and second steps of securing the strap 500 to the headrest 60 of the seat 50. Having first secured the top end 310 of the back portion 300 to the protrusion 550*c* (shown in FIG. 2) of the strap 500 via the fastener 190*c* (shown in FIG. 2), the top end 310 can be secured to the protrusion 550*a* (shown in FIG. 2) of the strap 500 via the fastener 190*a* (shown in FIG. 2).

FIG. 8 shows second and third steps of securing the strap 500 to the headrest 60 of the seat 50. Having now secured the top end 310 of the back portion 300 to the protrusion 550*a* of the strap 500 via the fastener 190*a*, the top end 310 can be secured to the protrusion 550*b* of the strap 500 via the fastener 190*b* as shown. As shown, the back portion 300 of the seat cover 100 and the strap 500 can define an opening 800 sized to receive the headrest post (or posts) 66 of the headrest 60.

FIG. 9 shows the condition of the seat cover 100 after the strap 500 has been secured to the back portion 300 about the headrest 60 of the seat 50. Any or all of the above-described steps can be re-ordered as desired.

The strap 500 can be separably joined with the mating fastener halves 590*a*,*b*,*c* of the fasteners 190*a*,*b*,*c* to the top end 310 of the back portion 300 of the seat cover 100 in each of a plurality of locations. By being "separably joined" to the back portion 300, the strap 500 can be selectively separated or removed from or joined to the back portion 300 as desired by the user. More specifically, the strap 500 can be joined with the fastener 190*a*,*b*,*c* to the top end 310 of the back portion 300 of the seat cover 100 in each of three locations, in which case each headrest post 66 of a pair of headrest posts 66 can be positioned between a pair of adjacent fasteners 190*a*,*b*,*c* of the fasteners 190*a*,*b*,*c*.

Figure 10:
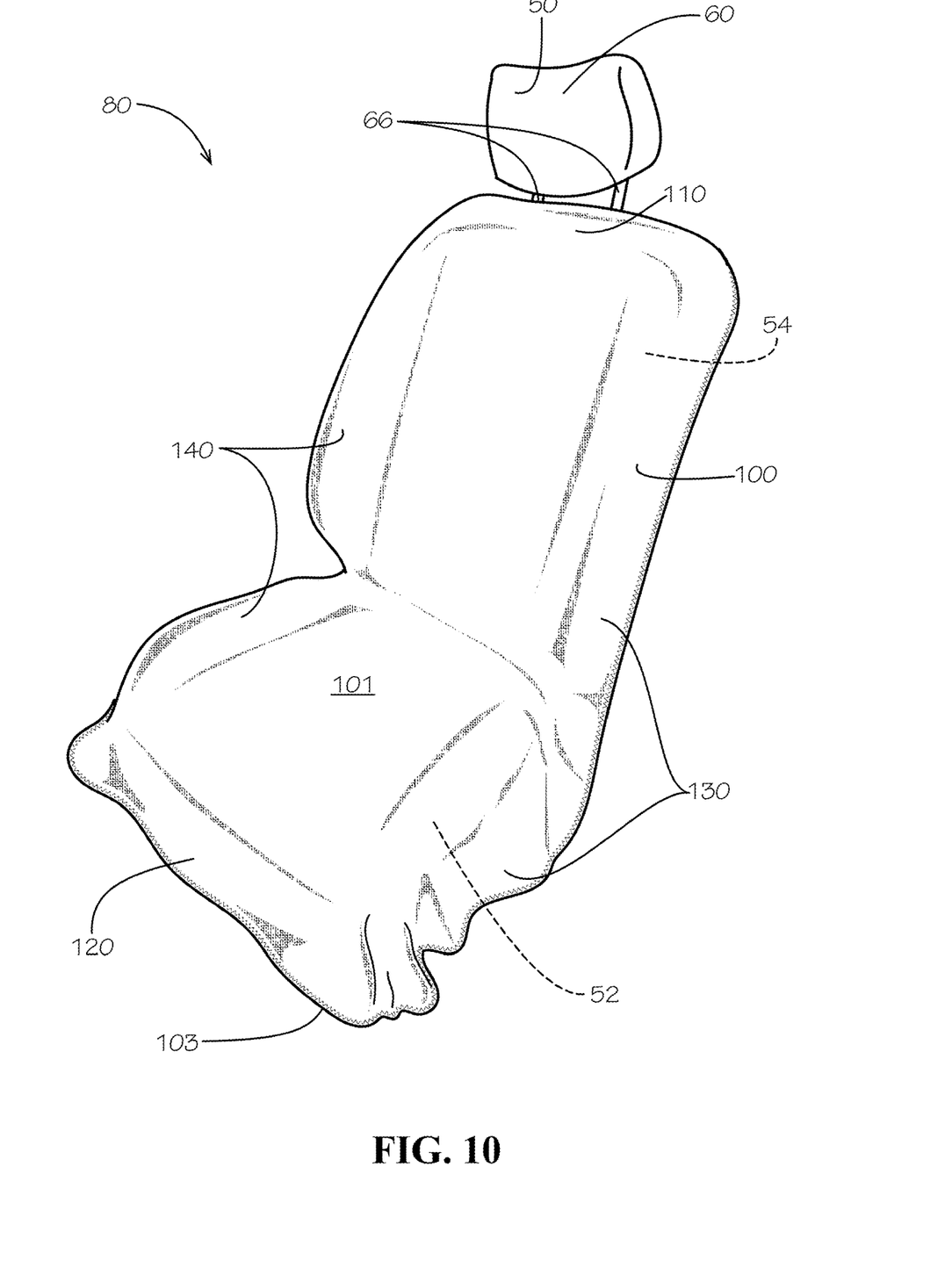
FIG. 10 is a perspective view of the seat cover of FIG. 1 when draped over a vehicle seat in accordance with another aspect of the current disclosure.

As shown in FIG. 10, in other aspects of the seat cover system 80 the seat cover 100 can be draped over the seat 50 like a towel. More specifically, as will be described, the seat cover 100 can be configured to remain fixed in position on the seat 50 over a long trip or even over multiple trips as desired. The seat cover 100 can comprise a top end 110, a bottom end 120, a first side end 130, and a fourth side end 140. As shown, the seat cover 100 can be sized to extend past and even beyond each edge of the seat cushion 52 and the back cushion 54 of the seat 50.

Figure 11:
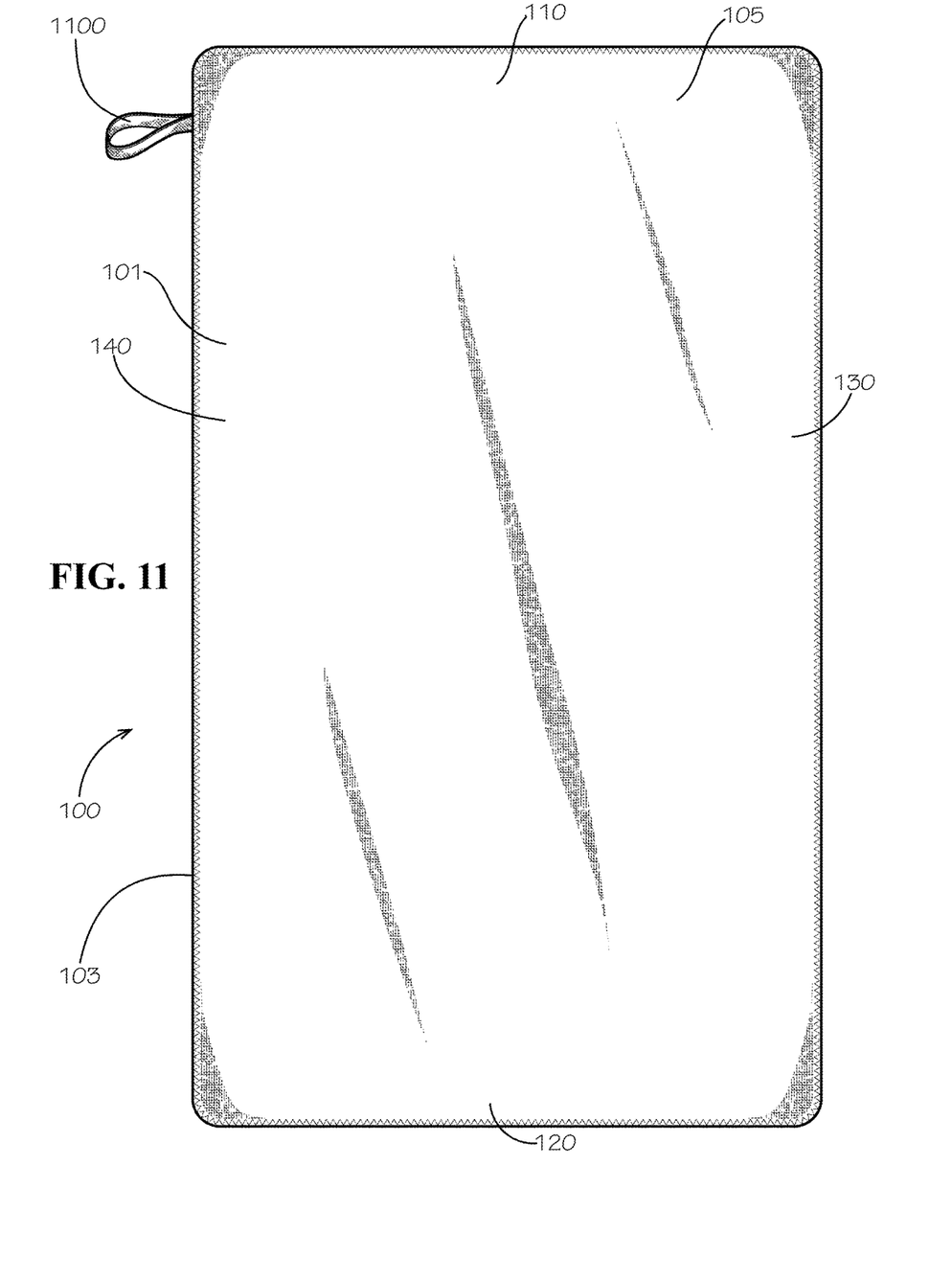
FIG. 11 is a top plan view of the seat cover of FIG. 10 in a flat or unrolled condition.

As shown in FIG. 11, the seat cover 100 can comprise an elastic strap 1100 connected to a panel 105. The strap 1100 can be secured to an outer edge of the panel 105 such as the edge 103. In some aspects, both of a pair of ends of the strap 1100 can be permanently secured to the edge 103. In some aspects, as described above, the edge 103 can receive an edge treatment such as, for example and without limitation, stitching, heat, and/or welding to contain or stabilize the material or for any other reason.

Figure 12:
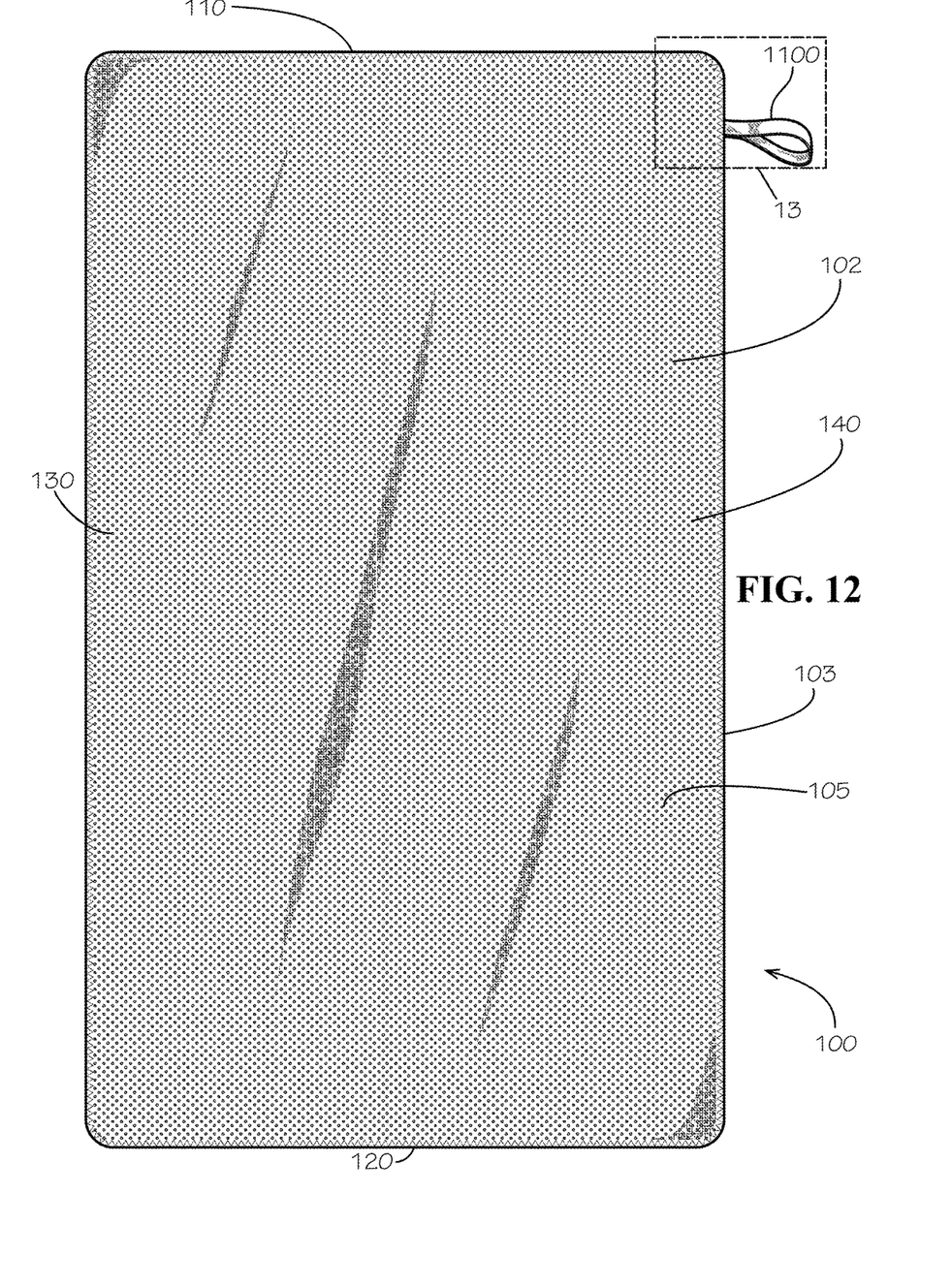
FIG. 12 is a bottom plan view of the seat cover of FIG. 10 in a flat or unrolled condition.

As shown in FIG. 12, the bottom surface 102 of the seat cover 100 can define a plurality of anti-slip elements 1400 (shown in FIGS. 13 and 14) protruding from the bottom surface 102 to help keep the seat cover 100 in position on the seat 50. In some aspects, the plurality of anti-slip elements 1400 can be arranged in a regular pattern as shown, where a regular pattern is reflected by consistent spacing between each of the plurality of anti-slip elements 1400. In other aspects, the plurality of anti-slip elements 1400 need not be arranged in any regular pattern. In other aspects, the plurality of anti-slip elements 1400 need not be arranged in any pattern at all. In some aspects, the anti-slip elements 1400 can be aligned in at least a one of the width direction W, the length direction L, or a one of the directions 1331,1341 (all shown in FIG. 13). Again, each of the plurality of anti-slip elements 1400 can help ensure that the seat cover 100 does not "slip" or move on the seat 50 by effectively increasing the coefficient of friction between a surface of the seat 50 and the bottom surface 102 of the seat cover 100.

Figure 13:
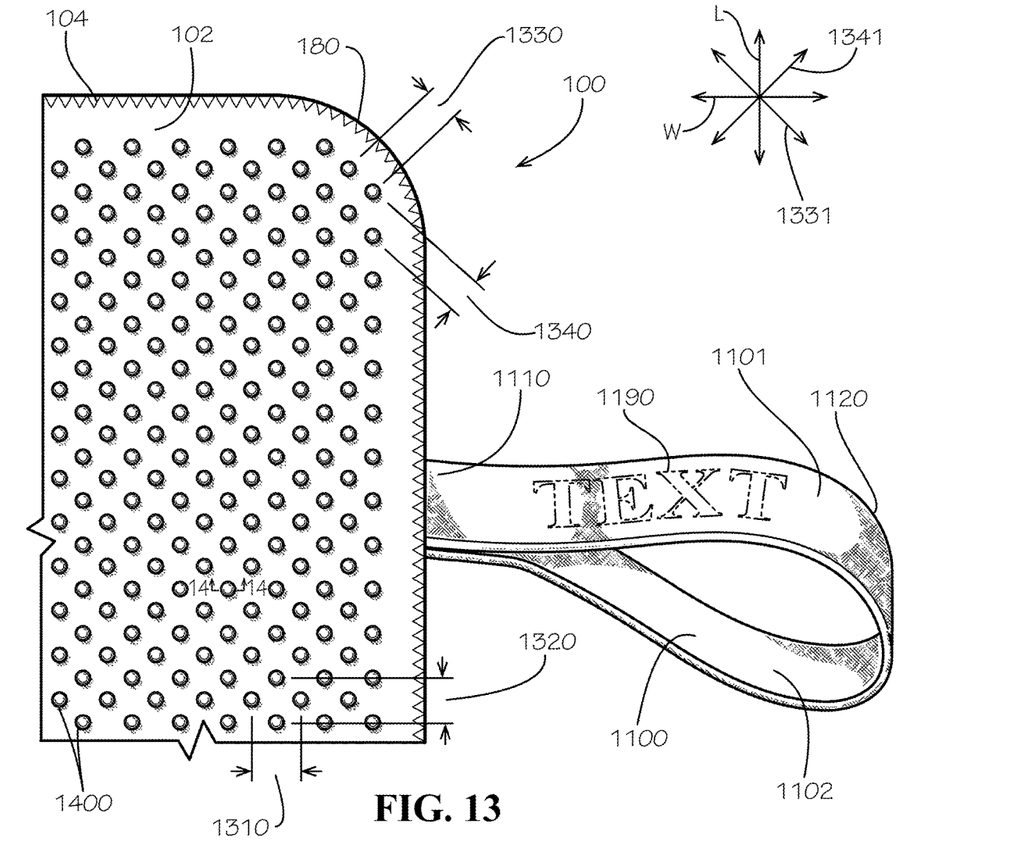
FIG. 13 is a detail view of the seat cover of FIG. 10 taken from detail 13 of FIG. 12 in accordance with another aspect of the current disclosure.

As shown in FIG. 13, the strap 1100 can define an outer surface 1101 and an inner surface 1102. The strap 1100 can comprise a proximal portion 1110 secured to the panel 105 of the seat cover 100 and a distal portion 1120 positioned distal from the proximal portion 1110. The strap 1100 can define indicia 1190 such as, for example and without limitation, text or a graphical design, which can affixed to the outer surface 1101 or even the inner surface 1102 by any desirable method such as, for example and without limitation, printing, embroidery or other stitching, or molding including overmolding. The strap 1100 can be formed from an elastic material which can stretch an amount equal to, for example and without limitation, twice an original length of the elastic material.

In the width direction W, which can be a first direction, each of adjacent anti-slip elements 1400 of the plurality of anti-slip elements 1400 can be spaced apart by a first center-to-center spacing 1310. In a length direction L, which can be a second direction that can be angled at 90 degrees with respect to the width direction W, each of adjacent anti-slip elements 1400 of the plurality of anti-slip elements 1400 can be spaced apart by a second center-to-center spacing 1320. In some aspects, either of the first center-to-center spacing 1310 or the second center-to-center spacing 1320 can be less than or equal to about 20 millimeters. In other aspects, either of the first center-to-center spacing 1310 or the second center-to-center spacing 1320 can be less than or equal to about 10 millimeters. In other aspects, either of the first center-to-center spacing 1310 or the second center-to-center spacing 1320 can be less than or equal to about 7 millimeters.

In the third direction 1331, which can be a first diagonal direction, each of adjacent anti-slip elements 1400 of the plurality of anti-slip elements 1400 can be spaced apart by a third center-to-center spacing 1330. In the fourth direction 1341, which can be a second diagonal direction that can be angled at 90 degrees with respect to the third direction 1331, each of adjacent anti-slip elements 1400 of the plurality of anti-slip elements 1400 can be spaced apart by a fourth center-to-center spacing 1340. In some aspects, either of the third center-to-center spacing 1330 or the fourth center-to-center spacing 1340 can be less than or equal to about 13 millimeters. In some aspects, either of the third center-to-center spacing 1330 or the fourth center-to-center spacing 1340 can be less than or equal to about 7 millimeters. In some aspects, either of the third center-to-center spacing 1330 or the fourth center-to-center spacing 1340 can be less than or equal to about 5 millimeters.

Figure 14:
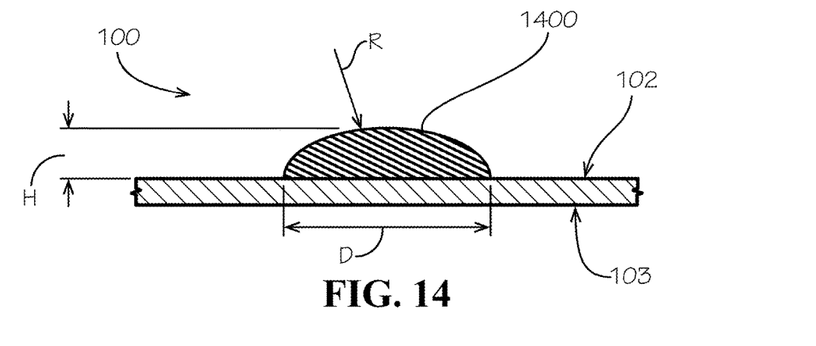
FIG. 14 is a sectional view showing one of a plurality of anti-slip elements of the claimed design of FIG. 10 taken from line 14-14 of FIG. 13.

In some aspects, as shown in FIG. 14, each of the plurality of anti-slip elements 1400 can have a rounded shape in cross-section. The shape of each of the plurality of anti-slip elements 1400 can define a radius R, which can be a constant radius or a variable radius. In other aspects, each of the plurality of anti-slip elements 1400 can have a non-rounded shape in cross-section. In some aspects, a height H of each of the plurality of anti-slip elements 1400 can be less than or equal to about 3.2 millimeters. In some aspects, a height of each of the plurality of anti-slip elements 1400 can be less than or equal to about 1.6 millimeters. In some aspects, a height of each of the plurality of anti-slip elements 1400 can be less than or equal to about 0.6 millimeters. In some aspects, a height of each of the plurality of anti-slip elements 1400 can be less than or equal to about 0.8 millimeters. In some aspects, the height H of each of the plurality of anti-slip elements 1400 can be equal to, for example and without limitation, approximately 25% of a diameter D of each of the plurality of anti-slip elements 1400. The diameter D of each of the plurality of anti-slip elements 1400 can be equal to, for example and without limitation, about 2.5 millimeters.

Figure 15:
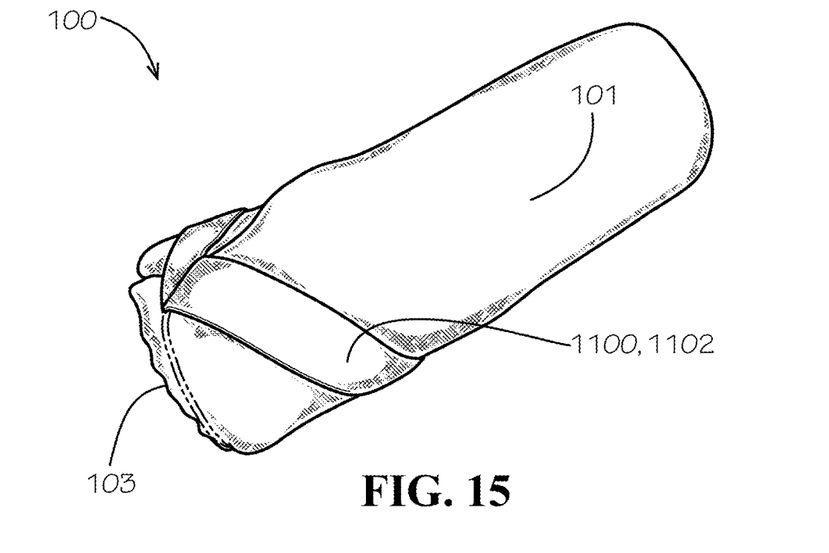
FIG. 15 is a perspective view of the seat cover of FIG. 10 in a rolled condition with a strap of the seat cover wrapped around the remainder of the seat cover to maintain the rolled condition.
Figure 16:
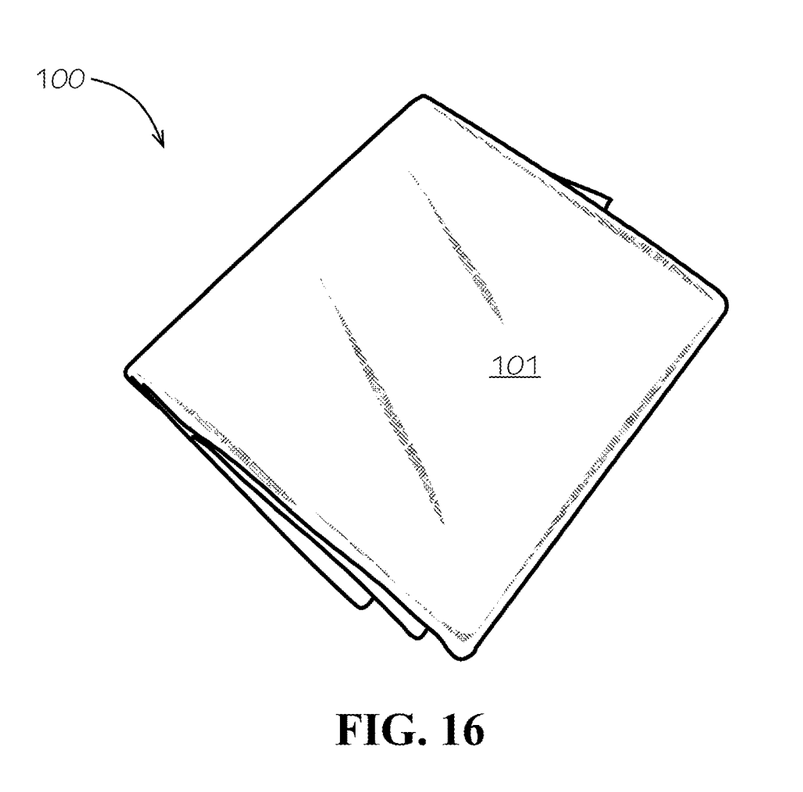
FIG. 16 is a perspective view of the seat cover of FIG. 1 in a folded condition.

As shown in FIG. 15, the seat cover 100—and specifically the panel 105—can be rolled up and secured in a rolled condition with the strap 1100. As shown in FIG. 16, the seat cover 100 can be folded into a folded condition.

In some aspects, any portion of the seat cover 100 such as, for example and without limitation, the seat portion 200, the back portion 300, the tab 400, or the strap 500 can be formed from any flexible material such as, for example and without limitation, a non-woven material. For example and without limitation, in some aspects the seat cover 100, including what is shown in FIGS. 1-9 and 16, can comprise a polypropylene material. In other aspects, the seat cover 100 can comprise a blend of polyester and nylon materials, which can form a microfiber or microfiber suede material. In other aspects, the seat cover 100 or a portion thereof can be formed from a woven material such as, for example and without limitation, a woven fabric material. In some aspects, the material forming the seat cover 100 can be resistant to passage of moisture from the top surface 101 to the bottom surface 102 of the seat cover 100 by a surface coating or by the use of a material having a natural resistance to the passage of moisture. In other aspects, the material forming the seat cover 100 can be impervious to passage of moisture from the top surface 101 to the bottom surface 102 of the seat cover 100 (i.e., waterproof) by a surface coating or by the use of a material having a natural resistance to the passage of moisture. The material can have antimicrobial properties for the purpose of reducing odor or otherwise reducing the growth of bacteria on the seat cover 100.

A method of using the seat cover 100 can comprise positioning the seat cover 100 over the seat 50. The method can further comprise placing the seat cover 100 on the seat 50 with the bottom surface 202 of the seat portion 200 of the seat cover 100 contacting a seat cushion 52 of the seat 50. The method can further comprise inserting the hand 70 of a user into the pocket opening 452 defined in the pocket 450 of the tab 400. The method can further comprise pushing the tab 400 of the seat cover 100 into a space between the back cushion 54 and the seat cushion 52 of the seat 50. The method can further comprise positioning the rear surface 302 of the back portion 300 against the back cushion 54 of the seat 50.

The method can further comprise securing the strap 500 to the back portion 300 of the seat cover 100 about the headrest post 66 of the headrest 60 of the seat 50. In some aspects, securing the strap 500 to the back portion 300 of the seat cover 100 can comprise securing the fastener 190a,b,c of the seat cover 100 in each of at least two fastening locations, each of the fasteners 190a,b,c comprising a hook-and-loop fastener. Securing the strap 500 at each fastening location can comprise securing a fastening half 390a,b,c and a mating fastener half 590a,b,c of each of the fasteners 190a,b,c to each other.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A seat cover for a seat, the seat cover comprising:
a seat portion formed from a flexible material, the seat portion defining a first side surface and a second side surface opposite from the first side surface;
a back portion formed from the flexible material and joined to the seat portion, the back portion defining a first side surface and a second side surface opposite from the first side surface, a bottom end of the back portion joined to a rear end of the seat portion, an angle between the seat portion and the back portion being adjustable; and
a tab extending from an intersection of the back portion and the seat portion, the tab forming a pocket defining a pocket opening facing the intersection of the back portion and the seat portion, the pocket opening sized to receive a user's hand.

2. The seat cover of claim 1, wherein the pocket comprises a first panel and a second panel, each of the first panel and the second panel defining an inside surface and an outside surface, the inside surface of the first panel facing the inside surface of the second panel.

3. The seat cover of claim 2, wherein a side edge of the first panel is joined to a side edge of the second panel, the first panel and the second panel forming a cavity therebetween, the only opening to the cavity being the pocket opening.

4. The seat cover of claim 2, wherein a first side edge of the first panel of the pocket is joined to a first side edge of the second panel of the pocket and a second side edge of the first panel is joined to a second side edge of the second panel.

5. The seat cover of claim 1, further comprising a removable strap configured to join the back portion to a headrest of the seat.

6. The seat cover of claim 1, wherein the flexible material is impervious to passage of moisture from the second side surface of the seat portion to the first side surface of the seat portion and from the second side surface of the back portion to the first side surface of the back portion.

7. The seat cover of claim 1, wherein the flexible material is a non-woven material.

8. A method of using a seat cover, the method comprising:
positioning the seat cover over a seat, the seat cover comprising a seat portion formed from a flexible material, the seat portion defining a first side surface and a second side surface opposite from the first side surface; and a back portion formed from the flexible material and joined to the seat portion, the back portion defining a first side surface and a second side surface opposite from the first side surface, a bottom side of the back portion joined to a rear side of the seat portion; and a tab extending from an intersection of the back portion and the seat portion, the tab forming a pocket defining a pocket opening facing the intersection of the back portion and the seat portion;
placing the seat cover on the seat with the first side surface of the seat portion of the seat cover contacting a seat cushion of the seat;
inserting a hand of a user into the pocket opening defined in the tab;
pushing the tab of the seat cover into a space between a back cushion and the seat cushion of the seat; and
positioning the first side surface of the back portion against the back cushion of the seat.

9. The method of claim 8, wherein the seat cover further comprises a removable strap, the method further comprising securing the strap to the back portion of the seat cover about a headrest post of a headrest of the seat.

10. The method of claim 9, wherein securing the strap to the back portion of the seat cover comprises securing a fastener of the seat cover in each of at least two fastening locations, the fastener being a hook-and-loop fasteners, at each fastening location a hook portion and a loop portion of each of the fasteners secured to each other.

11. The method of claim 9, wherein the headrest post is a first headrest post, the seat further comprising a second headrest post, the method of securing the strap to the back portion of the seat cover comprising securing a fastener of the seat cover in three fastening locations, at least one of the at least three fastening locations positioned between the first headrest post and the second headrest post.

* * * * *